United States Patent [19]
Morita

[11] Patent Number: 5,798,583
[45] Date of Patent: Aug. 25, 1998

[54] SPINDLE MOTOR HAVING RECESSED STATOR COILS

[75] Inventor: Isao Morita, Hanno, Japan

[73] Assignee: Kabushiki Kaisha Toshiba, Kanagawa-ken, Japan

[21] Appl. No.: 866,976

[22] Filed: Jun. 2, 1997

Related U.S. Application Data

[62] Division of Ser. No. 612,085, Mar. 7, 1996, Pat. No. 5,668,427.

[30] Foreign Application Priority Data

Jul. 26, 1995 [JP] Japan ................ 7-190659

[51] Int. Cl.$^6$ ............... H02K 15/02; H02K 1/06; H02K 1/14
[52] U.S. Cl. .................. 310/42; 310/216; 29/596
[58] Field of Search ................ 310/42, 67 R, 310/179, 216, 254; 29/596, 598

[56] References Cited

U.S. PATENT DOCUMENTS

| | | | |
|---|---|---|---|
| 3,886,383 | 5/1975 | Ross et al. | 310/12 |
| 5,138,209 | 8/1992 | Chuta et al. | 310/67 R |
| 5,539,974 | 7/1996 | Isayama | 310/42 |

*Primary Examiner*—Clayton E. LaBalle
*Attorney, Agent, or Firm*—Limbach & Limbach

[57] ABSTRACT

A magnet is provided on the inner circumferential surface of a hub rotatable about a central axis C of the motor, and a stator is arranged inside the inner circumferential surface of the hub to oppose the magnet. The stator core of the stator is formed by stacking substantially annular, plate-shaped core forming members, and has an annular portion arranged to be coaxial with the central axis, a plurality of winding portions projecting from the annular portion radially, and pole portions formed on the extending ends of the respective winding portions and opposing the magnet. Each winding portion is squeezed in the stacking direction by plastic formation such that its thickness is smaller than those of the annular portion and pole portion. A coil is wound on each squeezed winding portion.

5 Claims, 8 Drawing Sheets

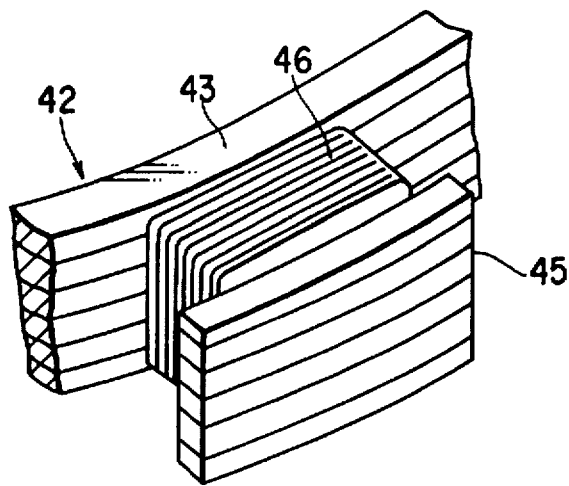
F I G. 4
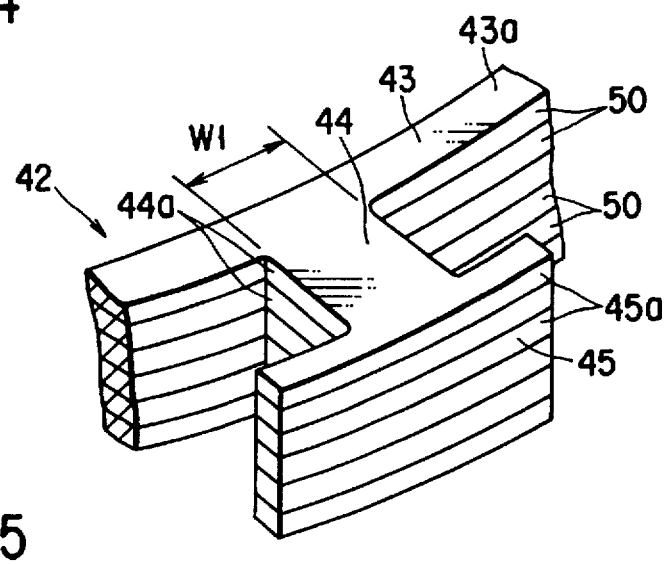
F I G. 5
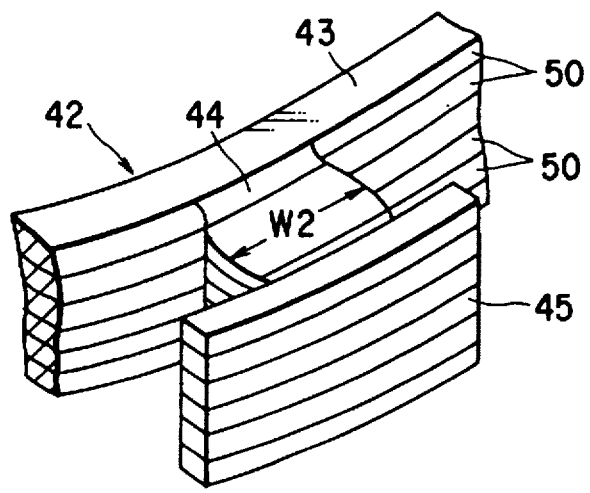
F I G. 6

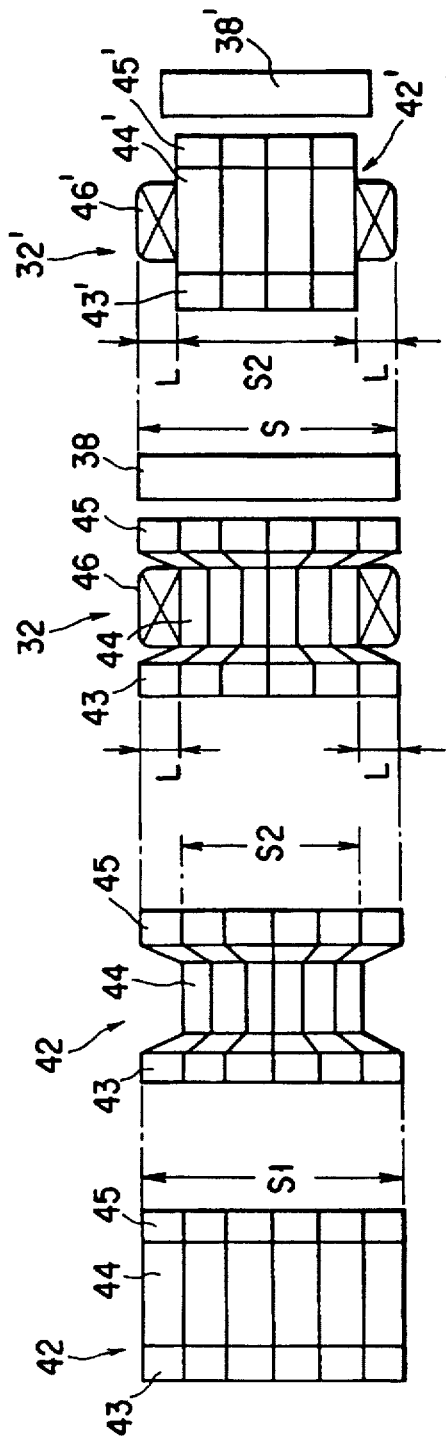
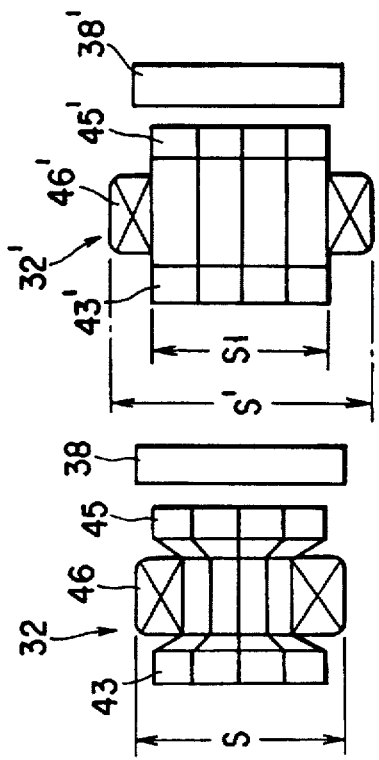
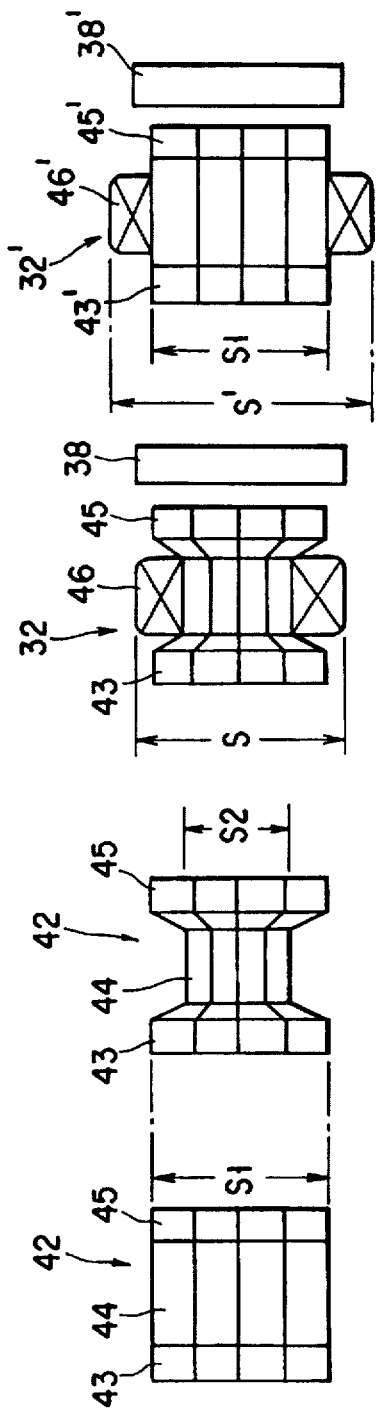

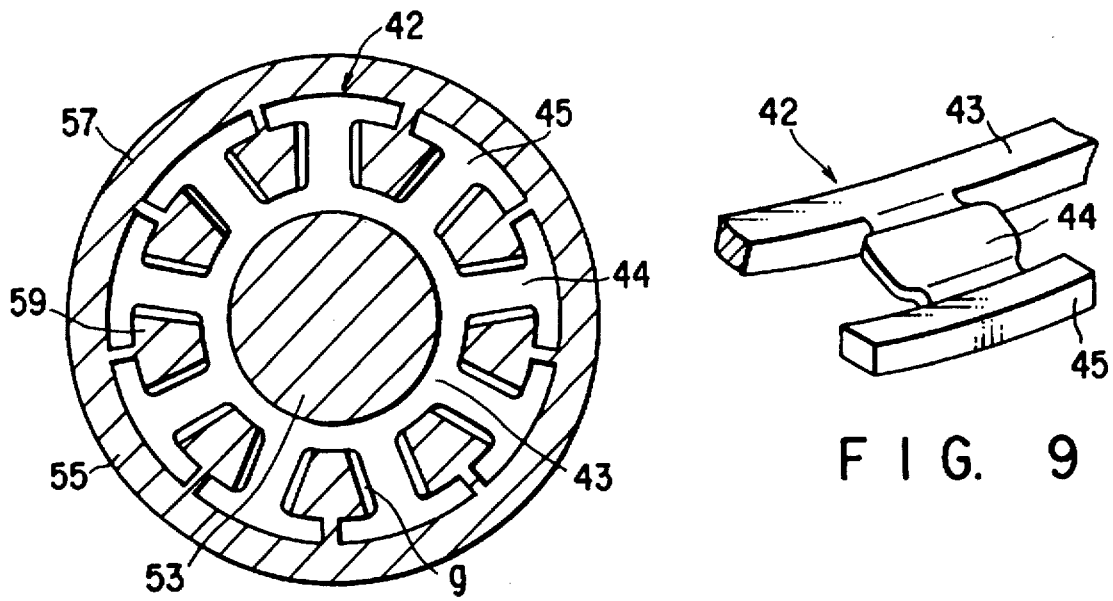
FIG. 8
FIG. 9
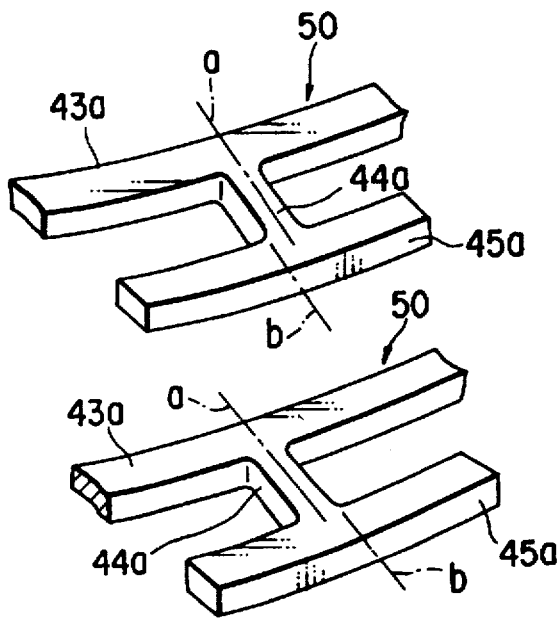
FIG. 10
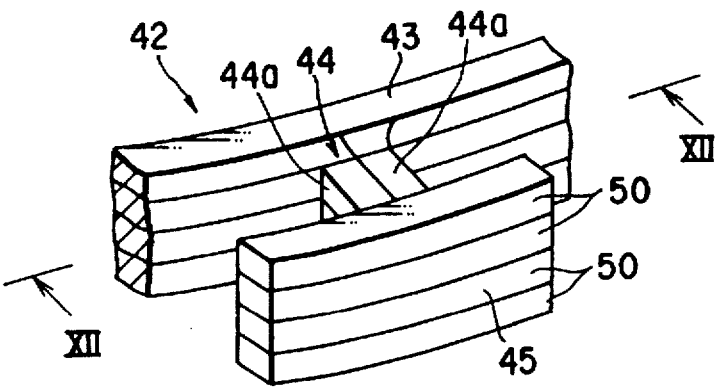
FIG. 11

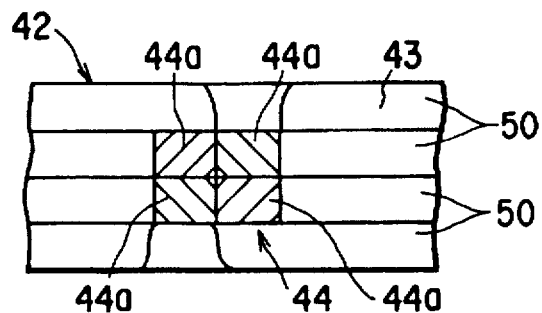
F I G. 12
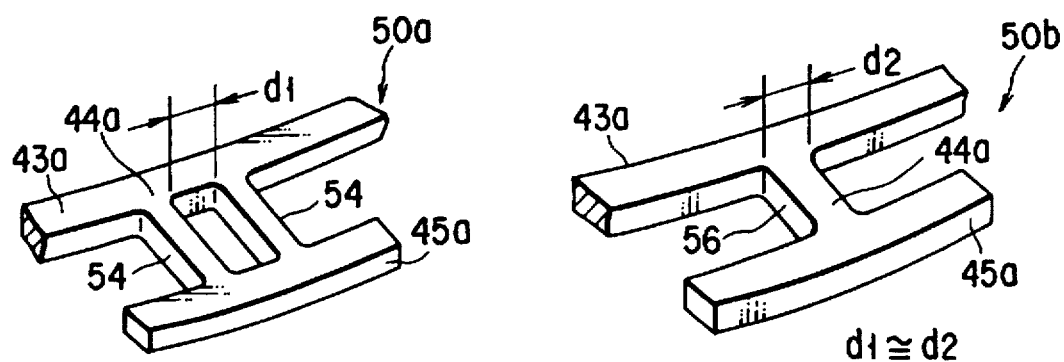
F I G. 13A   F I G. 13B
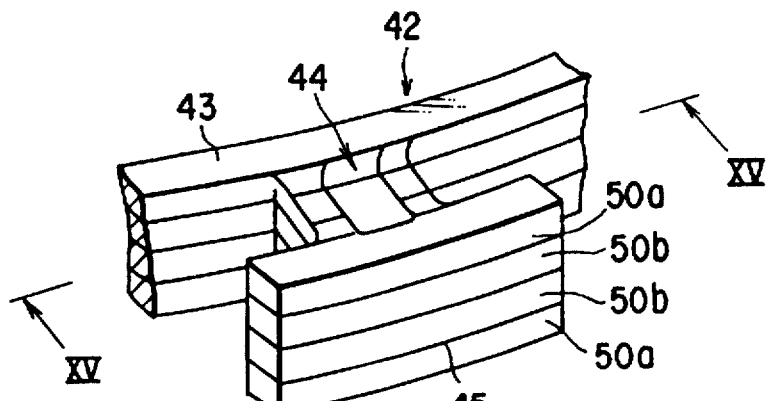
F I G. 14
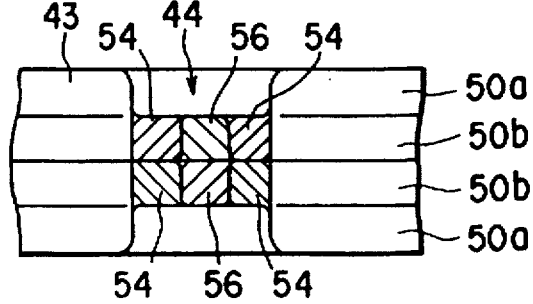
F I G. 15

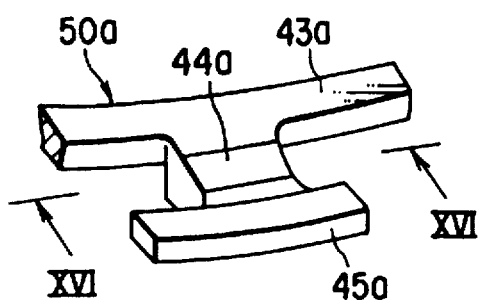
F I G. 16A
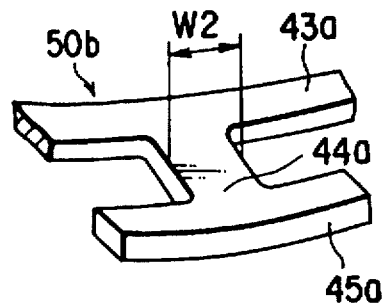
F I G. 16C
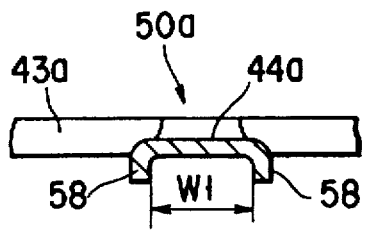
F I G. 16B
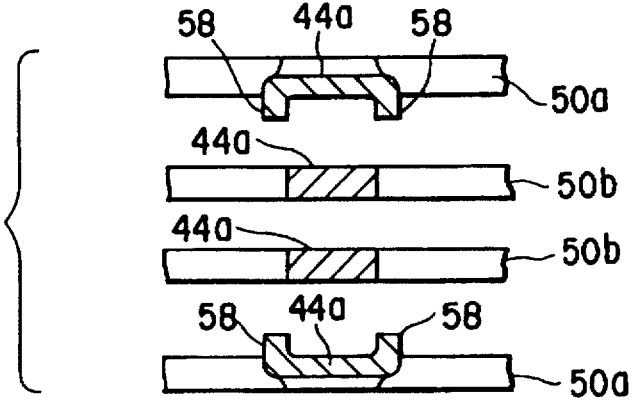
F I G. 17
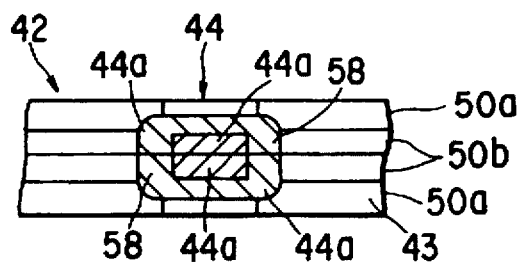
F I G. 18

SPINDLE MOTOR HAVING RECESSED STATOR COILS

This is a divisional of application Ser. No. 08/612,085, filed Mar. 7, 1996 now U.S. Pat. No. 5,668,425

BACKGROUND OF THE INVENTION

1. Field of the Invention

The present invention relates to a spindle motor, a method of manufacturing the spindle motor, and a magnetic disk drive having a spindle motor.

2. Description of the Related Art

In recent years, a so-called brushless DC servo motor is widely employed as a spindle motor used in a magnetic disk drive. In particular, in the magnetic disk drive, in order to decrease the size and increase the capacity of the magnetic disk drive, a so-called in-hub type spindle motor having a magnetic circuit portion in a hub that supports a magnetic disk is used to improve the space efficiency.

As such an in-hub type spindle motor, a motor having a double-sided support structure and a motor having a cantilevered support structure are provided. With the spindle motor having a double-sided support structure, a hub serving as a rotor is rotatably supported through a bearing by a stationary support shaft provided upright on the bottom wall of the magnetic disk drive, and the upper end of the support shaft is connected to the cover of the magnetic disk drive, thereby improving the rigidity of the stationary portions including the support shaft.

In the spindle motor having a cantilevered support structure, a bearing is provided in a cylindrical support projecting from the bottom wall of a magnetic disk drive, and a shaft integrally formed with the central portion of a hub that serves as a rotor is rotatably supported by the bearing.

Usually, the magnetic circuit portion of the spindle motor of these types is constituted by a back yoke, a magnet, a stator core, and coils, and is disposed between the inner circumferential surface of the hub and the bearing. The back yoke is integrally formed with the circumferential wall of the hub, and the magnet is formed annularly and is fixed to the inner circumferential surface of the hub.

Regarding the stator core, for example, a silicon steel plate having a thickness of 0.2 to 0.4 mm is press-cut to form a core member having a predetermined shape. A plurality of core members each obtained in this manner are stacked, thereby forming the stator core. The stator core has an inner cylindrical portion, a plurality of winding portions extending radially from the outer surface of the cylindrical portion, and wide end portions located at the extending ends of the respective winding portions. Slits are formed between adjacent winding portions. A coil is wound on the outer surface of each winding portion.

The upper and lower end portions of the coil wound on each winding portion project from the upper and lower surfaces, respectively, of the stator core. Hence, the effective thickness of the magnetic circuit portion becomes a sum of the projecting heights of the upper and lower end portions of the coil to the thickness of the stator core in the stacking direction. When designing a spindle motor, the stacking height of the stator core must be designed by considering the projecting heights of the end portions of the coils. In particular, when decreasing the size of the magnetic disk drive, the stacking thickness or height of the stator core is limited within a predetermined range as it largely influences the thickness of the entire spindle motor and the thickness of the magnetic disk drive.

To increase the capacity of the magnetic disk drive, the number of mounted magnetic disks must be increased. As the number of mounted magnetic disks is increased, the magnetic circuit efficiency, in particular the torque characteristics, of the spindle motor must be improved. Various methods are possible to improve the torque characteristics of the spindle motor, i.e., the torque characteristics of the magnetic circuit portion. Among these methods, one effective method is to increase the stacking thickness of the stator core, thereby increasing the motor constant.

More specifically, the motor constant is described by (torque constant)/(coil resistance)$^{1/2}$, and is proportional to the ½th or ¾th power of the stacking thickness of the stator core depending on the width and stacking thickness of the stator core. Accordingly, to increase the stacking thickness of the stator core is effective in increasing the motor constant.

As described above, however, the space in the magnetic disk drive where the spindle motor can be set is limited, and the stacking thickness of the stator core is limited accordingly. Further, the heights of the end portions of the coil wound on each winding portion of the stator core are added to the effective stacking thickness of the stator core, making it further difficult to increase the stacking thickness of the stator core.

In particular, in a low-profile spindle motor, i.e., in a spindle motor having a stator core with a small stacking thickness, the projecting heights of the end portions of the coil occupy a large proportion in the height of the entire magnetic circuit portion. This serves as a major obstacle in increasing the stacking thickness of the stator core.

Due to the above reasons, the conventional spindle motor has varied problems when improving its torque characteristics, and it is difficult to improve the torque characteristics without increasing the entire thickness.

SUMMARY OF THE INVENTION

The present invention has been made in view of the above problems, and has as its object to provide a spindle motor capable of improving its magnetic circuit characteristics without increasing its entire thickness, a method of manufacturing the spindle motor, and a magnetic disk drive having this spindle motor.

In order to achieve the above object, according to the present invention, there is provided a spindle motor comprising a rotor supported to be rotatable about a central axis and having an inner circumferential surface provided with a magnet, and a stator provided inside the inner circumferential surface to oppose the magnet. The stator core of the stator has an annular portion arranged to be coaxial with the central axis, a plurality of winding portions projecting from the annular portion radially with respect to the central axis, and pole portions formed on the extending ends of the winding portions and opposing the magnet.

Each winding portion is squeezed in the direction of the central axis by plastic formation such that its thickness in the direction of the central axis is smaller than those of the annular portion and pole portion. A coil is wound on each squeezed winding portion.

In the spindle motor having the above arrangement, each winding portion of the stator core is squeezed to have a thickness smaller than those of the annular portion and pole portion. Thus, when a coil is wound on each winding portion, the coil end portions in the axial direction of the stator core are entirely or at least partly embedded in the stator core, and the projecting heights of the coil end portions from the upper and lower surfaces of the stator core are greatly reduced. Therefore, the thickness of the stator core itself in the axial direction can be increased without increasing the entire height of the magnetic circuit portion including the stator and the coil. Because of the increase in thickness of the stator core, the magnetic circuit characteristics are improved without increasing the thickness of the entire spindle motor.

To set the same magnetic circuit characteristics as in the conventional spindle motor, the winding portions of the stator core are squeezed to decrease the projecting amounts of the coil end portions that project from the stator core, so that the thickness of the entire stator is decreased, thereby decreasing the size of the spindle motor.

According to the present invention, there is also provided a method of manufacturing a spindle motor including a rotor supported to be rotatable about a central axis and having an inner circumferential surface provided with a magnet, and a stator arranged inside the inner circumferential surface to oppose the magnet, the method comprising the steps of:

forming a substantially annular stator core having an annular portion, a plurality of winding portions extending from the annular portion radially outward with respect to the central axis, and pole portions formed on extending ends of the winding portions and opposing the magnet; squeezing each of the winding portions in a direction of the central axis by plastic formation such that a thickness thereof in the direction of the central axis is smaller than those of the annular portion and each of the pole portions; and winding a coil on each squeezed winding portion, thus constituting a stator.

When a stator core is formed by stacking a plurality of core forming members, after the core forming members are stacked, each winding portion is squeezed to be thin, and thereafter a coil is wound on each winding portion, thereby forming a stator.

According to the method of manufacturing the spindle motor, since the winding portions are squeezed in advance of winding coils on them, deformation in stator core during plastic formation is prevented to form winding portions having a small thickness. Deformation in the stator core during plastic formation can be prevented easily by, e.g., squeezing the winding portions while the inner and outer circumferential sides of the stator core are respectively held with jigs.

Furthermore, according to the present invention, there is provided a magnetic disk drive comprising a magnetic disk, a spindle motor for rotating the magnetic disk, and recording/reproducing means for recording/reproducing information on/from the magnetic disk. The spindle motor includes a rotor arranged to be rotatable about a central axis, having an inner circumferential surface on which a magnet is provided, and supporting the magnetic disk, and a stator arranged inside the inner circumferential surface of the rotor to oppose the magnet.

The stator core of the stator has an annular portion arranged to be coaxial with the central axis, a plurality of winding portions projecting from the annular portion radially with respect to the central axis, and pole portions formed on extending ends of the respective winding portions and opposing the magnet. Each winding portion is squeezed in the direction of the central axis by plastic formation such that its thickness in the direction of the central axis is smaller than those of the annular portion and pole portion. A coil is wound on each squeezed winding portion.

In the magnetic disk drive having the above mentioned arrangement, each winding portion of the stator core of the spindle motor is squeezed to have a thickness smaller than those of the annular portion and pole portion. When coils are wound on these winding portions, the projecting amounts of the end portions of the coil in the axial direction of the stator core are decreased. Then, the thickness of the stator core in the axial direction can be increased without increasing the entire height of the stator including the coils. Due to the increase in thickness of the stator core, the magnetic circuit characteristics can be improved without increasing the thickness of the entire spindle motor.

Since a spindle motor having improved magnetic circuit characteristics is realized, an increase in starting speed of the magnetic disk drive, an increase in stability against the load, and an increase in capacity in accordance with an increase in the number of mounted magnetic disks can be attained.

To set the same magnetic circuit characteristics as in a conventional spindle motor, the winding portions of the stator core are squeezed to decrease the projecting amounts of the end portions of the coils wound on these winding portions, so that the thickness of the entire stator is decreased, thus decreasing the size of the spindle motor. Then, the entire magnetic disk drive can be formed to have a low profile.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 7 show a magnetic disk drive according to a first embodiment of the present invention, in which:

FIG. 1 is an exploded perspective view of the magnetic disk drive,

FIG. 2 is an enlarged sectional view showing a spindle motor of the magnetic disk drive, FIG. 3 is a plan view schematically showing a magnetic circuit portion of the spindle motor, FIG. 4 is an enlarged perspective view showing part of the stator of the spindle motor, FIG. 5 is a perspective view showing part of a stator core before its winding portion is subjected to pressing, FIG. 6 is a perspective view showing part of the stator core after its winding portion is subjected to pressing, and FIGS. 7A to 7H are side views schematically showing the manufacturing steps of the stator and conventional stators;

FIG. 8 is a sectional view showing a jig used in pressing the stator core;

FIG. 9 is a perspective view showing an essential part of a stator core of a spindle motor according to a second embodiment of the present invention;

FIG. 10 is a perspective view showing essential parts of core forming members used in a spindle motor according to a third embodiment of the present invention;

FIG. 11 is a perspective view showing a stator core obtained by stacking core forming members shown in FIG. 10;

FIG. 12 is a sectional view taken along line XII—XII of FIG. 11;

FIG. 13A is a perspective view showing an essential part of a first core forming member used in a spindle motor according to a fourth embodiment of the present invention;

FIG. 13B is a perspective view showing an essential part of a second core forming member used in the spindle motor according to the fourth embodiment of the present invention;

FIG. 14 is a perspective view showing a stator core formed by stacking the first and second core forming members;

FIG. 15 is a sectional view taken along line XV—XV of FIG. 14;

FIG. 16A is a perspective view showing an essential part of a first core forming member used in a spindle motor according to a fifth embodiment of the present invention;

FIG. 16B is a sectional view taken along line XVI—XVI of FIG. 16A;

FIG. 16C is a perspective view showing an essential part of a second core forming member used in the spindle motor according to the fifth embodiment of the present invention;

FIG. 17 is a partially sectional side view showing the arrangement of the first and second core forming members of the fifth embodiment;

FIG. 18 is a partially sectional side view of a stator core formed by stacking the first and second core forming members of the fifth embodiment.

DETAILED DESCRIPTION OF THE PREFERRED EMBODIMENTS

Magnetic disk drives having spindle motors according to the preferred embodiments of the present invention will be described with reference to the accompanying drawings.

Figure 1:
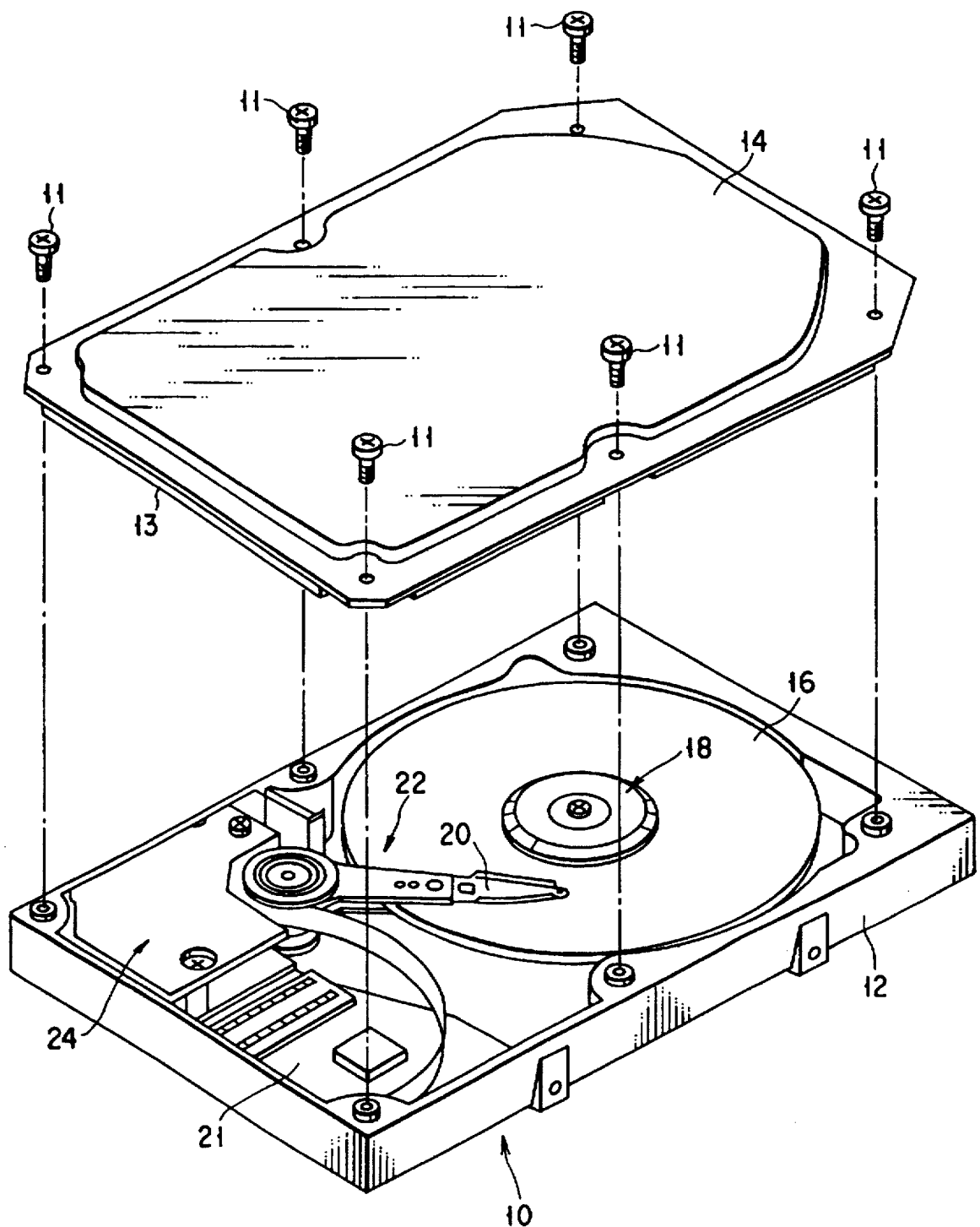

As shown in FIG. 1, a magnetic disk drive has a housing 10. The housing 10 has a main body 12 formed in a rectangular box-like shape with an upper end opening. More specifically, the main body 12 includes the main body having a rectangular bottom wall and side walls provided upright on the side edges of the bottom wall, and a top cover 14 fixed to the main body 12 with a plurality of screws 11 to close the upper end opening of the main body 12. A packing 13 is interposed between the top cover 14 and the main body 12.

A magnetic disk 16, a rotating mechanism 18, a pair of magnetic head assemblies 20, a carriage assembly 22, a voice coil motor 24, a preamplifier 21, and the like are housed in the housing 10. The magnetic disk 16 serves as a magnetic recording medium. The rotating mechanism 18 supports and rotates the magnetic disk 16. Each of the pair of magnetic head assemblies 20 has a magnetic head that serves as recording/reproducing means for recording/reproducing information on/from the magnetic disk 16. The carriage assembly 22 pivotally supports these magnetic head assemblies 20. The voice coil motor 24 rotates and positions the carriage assembly 22. A printed circuit board (not shown) for controlling the operations of the rotating mechanism 18, the voice coil motor 24, and the magnetic head assemblies 20 is fixed to the outer surface of the main body 12 with screws, to oppose the bottom wall of the main body 12.

Figure 2:
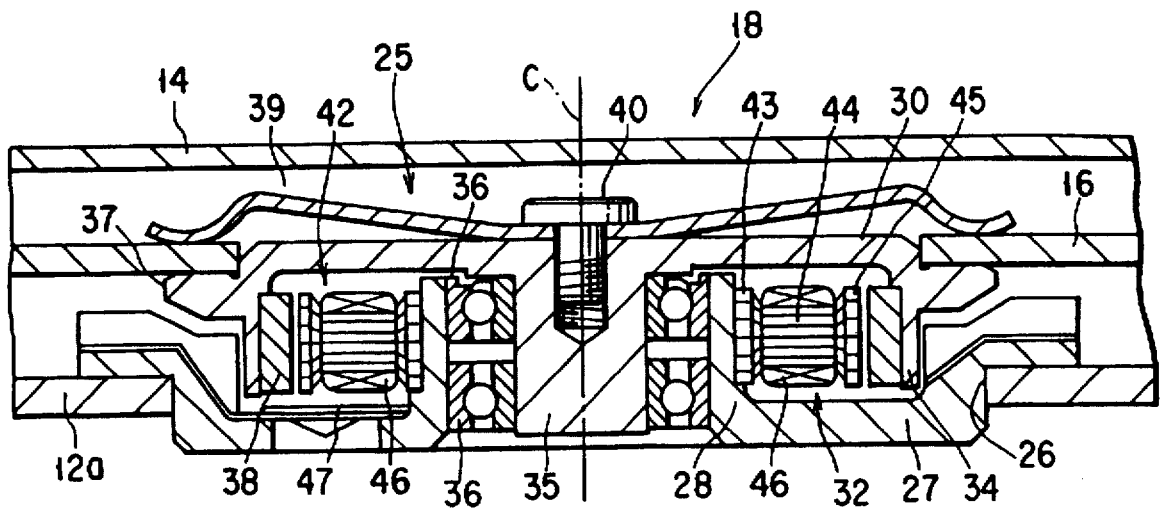

As shown in FIG. 2, the rotating mechanism 18 has a spindle motor 25 using a brushless DC servo motor. The spindle motor 25 has a bracket 27 which is fitted in a through hole 26 formed in the bottom wall 12a of the housing 10 and fixed to the bottom wall 12a with a plurality of screws. A cylindrical support 28 is integrally formed with the central portion of the bracket 27 to project upward from the bracket 27. A hub 30 serving as the rotor of the spindle motor 25, and a stator 32 are supported by the support 28.

More specifically, the hub 30 integrally has a cylindrical circumferential wall 34 and a shaft portion 35 coaxially provided inside the circumferential wall 34. The shaft portion 35 is inserted in the support 28 and supported by it through a pair of ball bearings 36. Accordingly, the hub 30 is supported by the support 28 to be rotatable about a central axis C. The circumferential wall 34 has an annular flange 37 projecting outward in the radial direction. An annular magnet 38 forming part of a magnetic circuit (to be described later) is fixed to the inner circumferential surface of the circumferential wall 34. The hub 30 is made of a magnetic material, and the circumferential wall 34 has a function of a back yoke.

The magnetic disk 16 has an inner hole at its central portion, and is placed on the bracket 27 such that the upper end portion of the hub 30 is fitted in this inner hole. A disk-shaped damper 39 consisting of a plate spring is mounted on the upper end of the hub 30 with a screw 40, and the inner peripheral portion of the magnetic disk 16 is clamped between the peripheral edge portion of the damper 39 and the flange 37. Thus, the magnetic disk 16 is held on the hub 30 and is rotatable together with the hub 30 about the central axis C.

The stator 32 of the spindle motor 25 has a stator core 42 fixed to the outer circumferential surface of the support 28 to be located inside the circumferential wall 34 of the hub 30, and a plurality of coils 46 mounted on the stator core 42.

Figure 3:
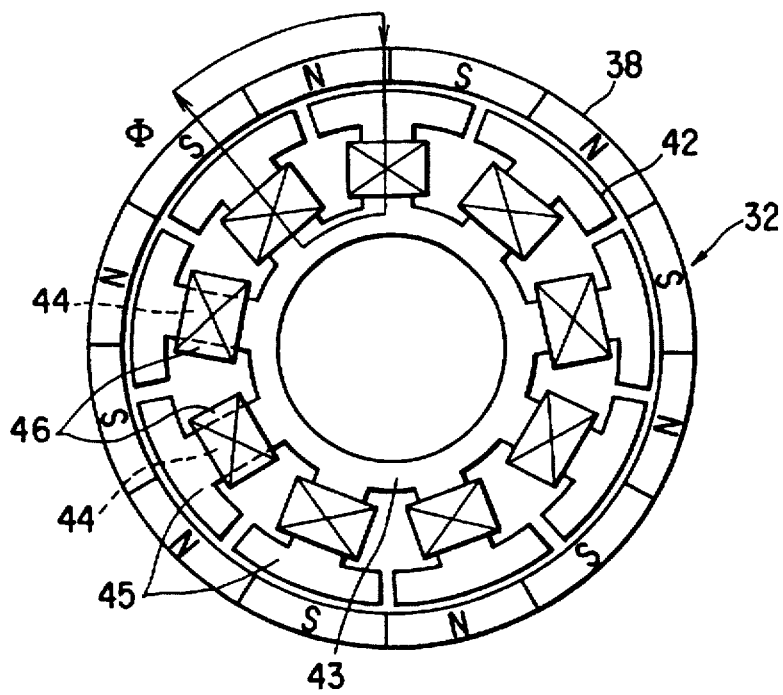

The magnetic circuit of the spindle motor 25 will be described in detail together with the arrangement of the stator 32. As shown in FIGS. 2 to 4, the annular magnet 38 is magnetized to have a number of poles, i.e., 12 poles in this embodiment.

The stator core 42 has an annular or cylindrical portion 43, nine winding portions 44, and pole portions 45. The annular portion 43 is fitted on the outer circumferential surface of the support 28. The nine winding portions 44 extend from the outer circumferential surface of the annular portion 43 outward in the radial direction with respect to the central axis C. The pole portions 45 are formed on the extending ends of the respective winding portions 44. The winding portions 44 are provided equidistantly in the circumferential direction of the annular portion 43. A coil 46 is wound on each winding portion 44. Each pole portion 45 is formed to be larger than the width of the corresponding winding portion 44 in the circumferential direction of the annular portion 43, and opposes the inner circumferential surface of the magnet 38 with a small gap.

Each coil 46 is electrically connected to the circuit board (described above) through a flexible circuit board 47. Hence, when the coils 46 are energized, a magnetic flux Φ generated by each coil 46 flows through the corresponding winding portion 44, the corresponding pole portion 45, the magnet 38, the adjacent pole portion 45, the adjacent winding portion 44, and the annular portion 43. Therefore, the hub 30 is driven by the mutual operations of the formed magnetic fields to rotate about the central axis C.

The arrangement and the manufacturing method of the stator core 42 will be described in further detail. In this embodiment, as shown in FIGS. 5 and 6, the stator core 42 is formed by stacking a plurality of, e.g., six, core forming members.

A core forming member 50 is formed substantially annularly by press-cutting a silicon steel plate having a thickness of about 0.2 to 0.4 mm with a pressing machine. Each core forming member 50 has an annular portion 43a, winding forming portions 44a, and pole portion forming portions 45a for forming the annular portion 43, the winding portions 44, and the pole portions 45, respectively, of the stator core 42, and is formed to have the same planar shape as that of the stator core 42. The six core forming members 50 have the same shape and same size.

These core forming members 50 are stacked coaxially such that their winding forming portions 44a and the pole portion forming portions 45 positionally coincide with one another, and are fixed to one another by caulking. As shown in FIG. 5, when the core forming members 50 are stacked, the annular portion 43, the winding portions 44, and the pole portions 45 are located on the same plane, and each winding portion 44 has a width W1 in the circumferential direction of the annular portion 43.

Subsequently, the winding portions 44 of the stator core 42 formed by stacking are squeezed by pressing in the axial direction of the annular portion 43, i.e., from above and below in the stacking direction. The thickness of each winding portion 44 in the stacking direction becomes smaller than the thickness of the annular portion 43 and the pole portion 45. Upon being squeezed, each winding portion 44 spreads to its two sides in the circumferential direction of the annular portion 43, and its width W2 becomes larger than the width W1 before pressing.

When squeezing the winding portions 44 of the stator core 42 by pressing, countermeasures must be taken so that the inner and outer diameters of the stator core 42 and the shapes of the pole portions 45 do not change due to the stress generated upon pressing. For this purpose, in this embodiment, pressing is performed by holding the stator core 42 with a jig, as shown in FIG. 8.

This jig has an inner jig 53 and an outer jig 55. The inner jig 53 is formed into a circular column having a diameter almost the same as the inner diameter of the annular portion 43, and is fitted in the inner hole of the annular portion 43. The outer jig 55 has a cylindrical portion 57 and a plurality of projecting portions 59. The cylindrical portion 57 has an inner diameter almost the same as the outer diameter of the stator core 42 and is fitted on the outer circumferential surface of the stator core 42. The projecting portions 59 extend from the inner circumferential surface of the cylindrical portion 57 toward the center and can respectively enter slits among the winding portions 44 of the stator core 42.

These projecting portions 59 are formed such that a circle defined by their distal end portions has a diameter nearly equal to the outer diameter of the annular portion 43 of the stator core 42. Each projecting portion 59 has a width smaller than that of the corresponding slit of the stator core 42. Thus, each projecting portion 59 is inserted in the corresponding slit such that its distal end face abuts against the outer circumferential surface of the annular portion 43 of the stator core 42, while maintaining a predetermined gap g with respect to the winding portions 44 located on its two sides.

When the winding portions 44 are subjected to pressing while the inner jig 53 and the outer jig 55 having the above arrangement are mounted on the stator core 42, the variations of the inner diameter of the annular portion 43 are prevented by the inner jig 53, and the variations of the outer diameter of the annular portion 43 are prevented by the projecting portions 59 of the outer jig 55. Any variations of the outer diameter of the stator core 42, including the deformation of the pole portions 45, are prevented by the cylindrical portion 57 and the projecting portions 59 of the outer jig 55.

Since the gap g is formed between the winding portions 44 and the projecting portions 59 of the outer jig 55, during pressing, the winding portions 44 can spread in the circumferential direction of the annular portion 43 by a distance corresponding to the gap g.

After the above pressing operation is performed, the coils 46 are wound on the corresponding squeezed winding portions 44, thereby forming the stator 32 shown in FIG. 4. After winding the coils 46, the stator 32 is subjected to a surface treatment with an epoxy-based resin by coating, electrodeposition, or the like, so that the insulation resistance between the coils 46 and the stator core 42 is ensured.

FIGS. 7A to 7C, and 7E to 7G schematically show the manufacturing steps of the stator 32 described above. As shown in FIG. 7A, assuming that the stacking thickness of the stator core 42 before pressing is defined as S1, the winding portions 44 of the stator core 42 are squeezed until their stacking thickness S2 reaches a predetermined value smaller than the stacking thickness S1 (S2<S1), as shown in FIG. 7B.

Subsequently, the coil 46 is wound on each winding portion 44. As shown in FIG. 7C, assuming that the height or thickness of each end portion of each coil 46 is defined as L, when the stacking thickness S2 of the squeezed winding portion 44 is set to (S1<2L), a thickness S of the entire magnetic circuit portion including the magnet 38 and the stator 32 after coil winding substantially coincides with the stacking thickness S1 of the annular portion 43 or the pole portion 45 of the stator core 42.

FIG. 7D shows a conventional magnet 38' and stator 32' which is formed by winding coils 46' on winding portions 44' of a stator core 42' formed by stacking four core forming members. Assuming that the stacking thickness of the stator core 42' is defined as S2 and that the thickness of each end portion of the coil 46' is defined as L, the thickness of the entire stator 32' is S.

As is apparent from comparison with the conventional stator 32' shown in FIG. 7D, in the stator 32 of this embodiment shown in FIG. 7C, when the winding portion 44 of the stator core 42 is formed thin by squeezing, the thickness L of the coil 46 wound on the winding portion 44 is absorbed entirely or at least partly. Despite that the number of stacked core forming members is increased from four to six, the thickness S of the entire stator 32 is maintained at substantially the same value as that of the conventional stator 32'.

In the magnetic disk apparatus having the above arrangement, each winding portion 44 of the stator core 42 of the spindle motor 25 is squeezed in the stacking direction to be thinner than the stacking thickness of the annular portion 43 and the pole portion 45, and the coil 46 is wound on each squeezed winding portion 44. Hence, the stacking thickness of the stator core 42 can be increased by increasing the number of core forming members 50 stacked without increasing the thickness of the entire stator 32, i.e., the thickness of the spindle motor 25 in the direction of the central axis C. Accordingly, the torque characteristics of the spindle motor 25 can be largely improved by increasing the motor constant without changing the entire height of the spindle motor 25.

For example, when the number of core forming members stacked is increased from four to six, as in the embodiment described above, assuming that the coil resistance is the same and the torque constant is proportional to the number of core forming members stacked, a motor constant km is improved to 6/4=1.5 times.

Assume a spindle motor of a conventional arrangement in which the stator is constructed by winding coils having a coil end portion L=0.7 mm on a stator core obtained by stacking 15 core forming members each having a thickness of 0.3 mm. When a spindle motor having the same height as that of the above spindle motor is formed with the arrangement of the above embodiment, the winding portions of the stator core are squeezed by an amount to absorb the height 2L of the upper and lower end portions of the coil, for example, so that the number of core forming members stacked can be increased to 19 by 2L/0.3=about 4 without changing the entire height S of the stator.

In this case, assuming that the coil resistance is the same and that the torque constant is proportional to the number of core forming members stacked, the motor constant km is improved to 19/15=1.27 times. From 15/19=0.79, the winding portions need only be squeezed to about 80% the stacking thickness of the stator core.

When the stator core has a large stacking thickness, it is possible to set a large winding portion squeezing amount. When, however, the squeezing amount is excessively large, precision management of the stator core itself becomes difficult, and swelling of the winding portions in the circumferential direction becomes excessively large, thus interfering with coil winding. For this reason, the squeezing amount of the winding portions must be appropriately selected as required. Note that the squeezing amount may well increase upon future developments of the press technique.

As each winding portion 44 spreads in the circumferential direction upon being squeezed, its sectional area remains substantially the same as that obtained before squeezing. Hence, even if the winding portions are deformed thin by squeezing, the effective sectional area through which the magnetic flux flows does not decrease, and a decrease in magnetic circuit efficiency is not caused.

In the magnetic disk apparatus having the spindle motor 25 of the above arrangement, when the torque characteristics are improved, as described above, various operations and effects can be obtained, e.g., reduction in starting time of the magnetic disk, increase in stability of the rotation of the magnetic disk against the load, realization of an increase in capacity in accordance with an increase in number of mounted magnetic disks, and the like.

In the above embodiment, the stacking thickness of the stator core is increased without changing the height of the spindle motor. However, as shown in FIGS. 7E to 7H, when a stator core 42 is formed by stacking the same number of, e.g., four, core forming members, as in the stator 32' of the conventional spindle motor, with the present invention, the height S of the entire stator can be decreased to be smaller than the height S' of the entire stator of the conventional spindle motor while maintaining the stacking thickness S1 of the stator core 42 at the same level as in the conventional case. Accordingly, the spindle motor can be made thin if the torque characteristics of the spindle motor 25 are to be held at the same level as in the conventional case. As a result, the thickness of the entire magnetic disk drive can be decreased.

In the embodiment described above, a spindle motor whose stator core is formed by stacking a plurality of core forming members is described. However, a stator core 42 may be formed of a single plate, as shown in FIG. 9. In this case as well, a stator is formed by squeezing winding portions 44 of the stator core 42 by pressing to be thinner than an annular portion 43 and a pole portion 45, and winding coils on the squeezed winding portions, and operations and effects identical to those described above can be obtained. Furthermore, a stator core can also be formed by stacking a plurality of core forming members each having the same structure as that of the stator core having squeezed winding portions 44 as shown in FIG. 9. The same operations and effects as those described above can be obtained with this arrangement as well.

FIGS. 10 to 12 show the arrangement and the manufacturing method of a stator core 42 of a spindle motor according to still another embodiment of the present invention. In this embodiment, as shown in FIG. 10, each core forming member 50 has an annular portion 43a, winding forming portions 44a extending from the annular portion 43a radially outward, and pole portion forming portions 45a formed on the extending ends of the respective winding forming portions 44a, and is formed of a thin plate into an annular shape. Each of the pole portion forming portions 45a has an arcuated shape and is coaxial with the annular portion 43a. Each of the pole portion forming portion 45a is arranged such that an axis b passing the circumferentially middle position of the pole portion forming portion 45a is offset from a central axis a of the corresponding winding forming portion 44a in the circumferential direction. In particular, the amount of offset between the central axes a and b is set to about half the width of the winding forming portion 44a in the circumferential direction of the annular portion 43a.

To form a stator core 42, first, core forming members 50 are stacked coaxially such that they alternately face up and down and their pole portion forming portions 45a are aligned with each other, and are fixed to each other by caulking. Then, the winding forming portions 44a of every two adjacent core forming members 50 are offset from each other in the circumferential direction by a distance corresponding to their width.

In this state, as shown in FIGS. 11 and 12, the winding portions 44 of the stator core 42 are squeezed by pressing from above and below in the stacking direction. Hence, when forming the stator core 42 by stacking, e.g., four core forming members 50, the winding forming portion 44a of each of the uppermost and lowermost core forming members is deformed until it is level with the other adjacent winding forming portion 44a. Therefore, each winding portion 44 formed by these winding forming portions 44a has a thickness in the stacking direction, which is smaller than the stacking thickness of the annular portion 43 and the pole portion 45.

After this pressing, coils are wound on the respective thinly squeezed winding portions 44, thereby forming the stator.

Also in this still other embodiment having the above arrangement, the stacking thickness of the stator core 42 can be increased by increasing the number of core forming members 50 stacked without increasing the thickness of the entire stator, i.e., the thickness of the spindle motor in the direction of the central axis C. Accordingly, the torque characteristics of the spindle motor can be largely improved by increasing the motor constant without changing the entire height of the spindle motor.

In still another embodiment of the present invention shown in FIGS. 13A to 15, a stator core 42 of a spindle motor is formed by stacking two types of core forming members. More specifically, as shown in FIGS. 13A and 13B, the stator core 42 is formed by using first core forming members 50a and second core forming members 50b.

The first and second core forming members 50a and 50b each have an annular portion 43a, a plurality of winding forming portions 44a extending outward from the annular portion 43a in the radial direction, and pole portion forming portions 45a provided at the extending ends of the winding forming portions 44a, and have the same shape and size except for its winding forming portions 44a.

Each winding forming portion 44a of each first core forming member 50a is constituted by a pair of extending portions 54. These extending portions 54 extend between the annular portion 43a and the pole portion forming portion 45a to be parallel to each other, and are separated from each other by a predetermined distance d1 in the circumferential direction.

Each winding forming portion 44a of each second core forming member 50b is constituted by a single extending portion 56 extending between the annular portion 43a and the pole portion forming portion 45a. A width d2 of the extending portion 56 in the circumferential direction of the annular portion 43a is substantially the same as the predetermined distance d1.

To form the stator core 42 with the first and second core forming members 50a and 50b, first, a plurality of pairs of first and second core forming members 50a and 50b are prepared, are stacked coaxially such that their pole portion forming portions 45a are aligned, and are fixed to each other by caulking. Hence, the extending portion 56 of each winding forming portion 44a of each second core forming member 50b is located to oppose the gap between the pair of extending portions 54 of the corresponding winding forming portion 44a of the adjacent first core forming member 50a.

In this state, as shown in FIGS. 14 and 15, winding portions 44 of the stator core 42 are squeezed by pressing from above and below in the stacking direction. Thus, when forming the stator core 42 by stacking, e.g., two pairs of first and second core forming members 50a and 50b, the extending portions 54 of the winding forming portion 44a of each of the uppermost and lowermost first core forming members 50a are deformed until they are level with the extending portion 56 forming the corresponding winding forming portion 44a of the adjacent second core forming member 50b, and the extending portion 56 of the second core forming member 50b is accommodated between these pair of extending portions 54. Accordingly, the winding portions 44 of the stator core 42 formed by these winding forming portions 44a have a thickness in the stacking direction, which is smaller than those of an annular portion 43 and the pole portion 45.

After this pressing, coils are wound on the respective thinly squeezed winding portions 44, thus forming a stator.

Also in this still other embodiment having the above arrangement, the stacking thickness of the stator core 42 can be increased by increasing the number of core forming members stacked without increasing the thickness of the entire stator. Accordingly, the torque characteristics of the spindle motor can be largely improved without changing the entire height of the spindle motor. Note that the numbers of first and second core forming members stacked can be increased or decreased as required.

FIGS. 16A to 18 show still another embodiment in which a stator core is formed by stacking two types of core forming members in the same manner as in the above embodiment. More specifically, as shown in FIGS. 16A to 16C, a stator core 42 is formed by using substantially annular first and second core forming members 50a and 50b each obtained by press-cutting a thin plate.

The first and second core forming members 50a and 50b each have an annular portion 43a, a plurality of winding forming portions 44a extending outward from the annular portion 43a in the radial direction, and pole portion forming portions 45a provided at the extending ends of the winding forming portions 44a, and have the same shape and size. Each winding forming portion 44a of each first core forming member 50a is thin as it is squeezed in the direction of the thickness by pressing, and its two end portions in the circumferential direction of the annular portion 43a are plastic-deformed to spread in the circumferential direction. The two spread end portions are bent at substantially right angles in the same direction to form a pair of bent portions 58.

A gap W1 between the bent portions 58 is set to be substantially equal to the width of the winding forming portion before plastic formation, i.e., substantially the same as a width W2 of each winding forming portion 44a of each second core forming member 50b.

As shown in FIGS. 17 and 18, to form the stator core 42 by using the first and second core forming members 50a and 50b, a plurality of, e.g., two, second core forming members 50b are arranged between two first core forming members 50a. The first and second core forming members 50a and 50b are stacked coaxially such that their pole portion forming portions 45a are aligned, and are fixed to each other by caulking. At this time, the upper and lower two first core forming members 50a are stacked such that bent portions 58 of their winding forming portions 44a project toward the second core forming members 50b.

Hence, the winding forming portion 44a of each second core forming member 50b is fitted between the bent portions 58 of the corresponding winding forming portion 44a of the adjacent first core forming member 50a. Accordingly, the winding forming portions 44a of the two second core forming members 50b are surrounded by the winding forming portions 44a of the first core forming members 50a, and these winding forming portions 44a form each winding portion 44 of the stator core 42. The thickness of each winding portion 44 in the stacking direction is smaller than those of an annular portion 43 and the pole portion 45.

Also in this still other embodiment having the above arrangement, the stacking thickness of the stator core 42 can be increased by increasing the number of core forming members stacked without increasing the thickness of the entire stator. Accordingly, the torque characteristics of the spindle motor can be largely improved without changing the entire height of the spindle motor. Since the first core forming members having the winding forming portions 44a that are squeezed in advance are used, the stator core after stacking need not be plastic-deformed, so that the processability of the spindle motor is improved while a sufficient effective sectional area of the winding portion is maintained. The same operations and effects as those described above can be obtained even if the number of second core forming members stacked is increased as required.

In the plurality of embodiments described above, comparatively low-profile spindle motors having six or less stacked core forming members are described. However, the present invention is not limited to these, but can also be applied to a high-profile spindle motor having a large number of stacked core forming members.

Figure 19:
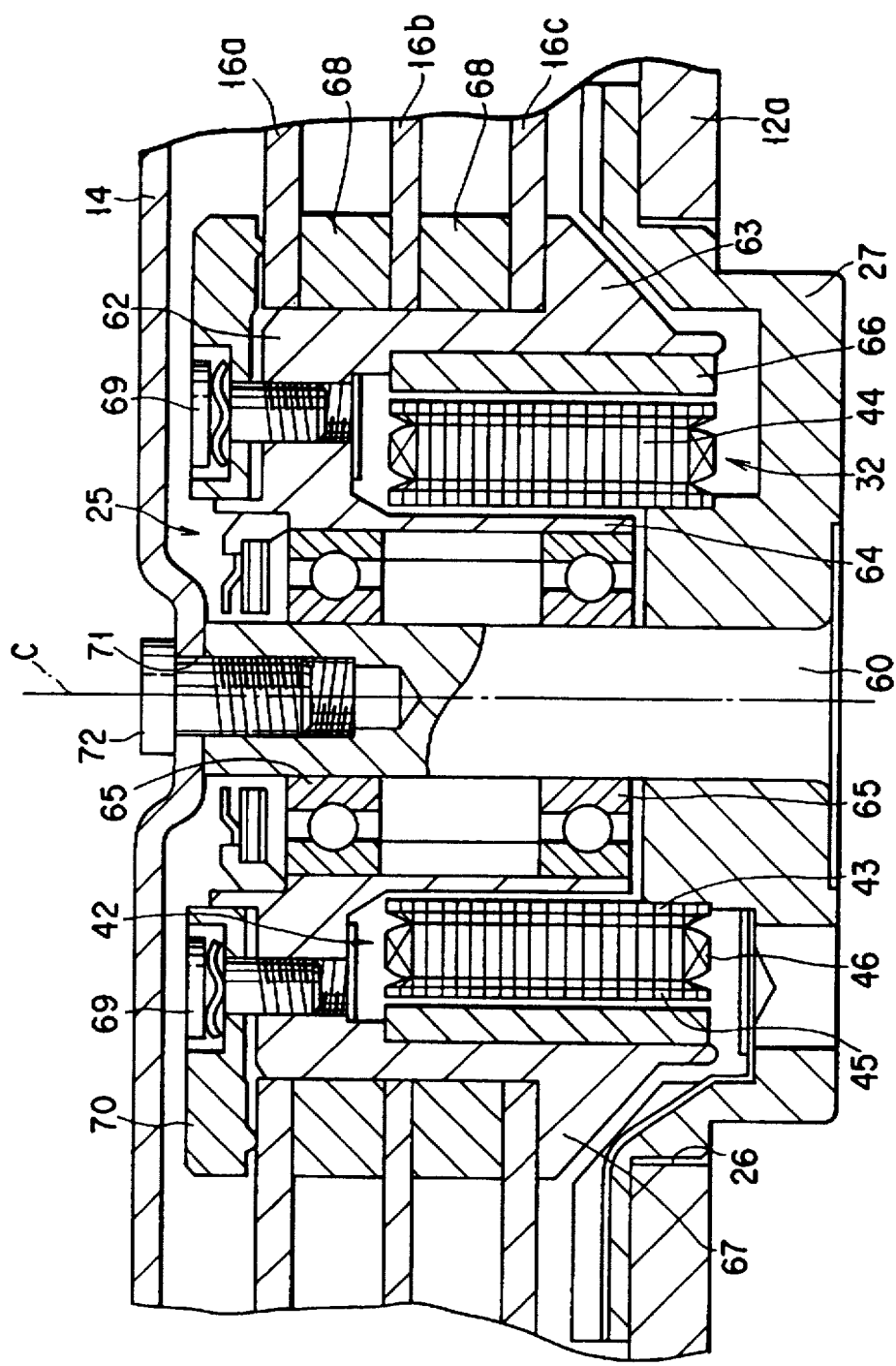
FIG. 19 is an enlarged sectional view of a spindle motor portion of a magnetic disk drive comprising a high-profile spindle motor according to a sixth embodiment of the present invention.

FIG. 19 shows a high-profile spindle motor 25 in the type of a brushless DC servo motor and incorporated in a magnetic disk drive. This spindle motor 25 has a bracket 27 which is fitted in a through hole 26 formed in a bottom wall 12a of a housing 10 of the magnetic disk drive and is fixed to the bottom wall 12a with a plurality of screws. A stationary support shaft 60 stands upright at the central portion of the bracket 27. A hub 62 serving as the rotor of the spindle motor 25 is rotatably supported by the support shaft 60.

More specifically, the hub 62 is formed to integrally have a cylindrical circumferential wall 63 and a cylindrical support 64 coaxially provided inside the circumferential wall 63. The support 64 is arranged outside the support shaft 60 to be coaxial with it, and is supported by it through a pair of ball bearings 65. Accordingly, the hub 62 is supported by the support shaft 60 to be rotatable about a central axis C.

The circumferential wall 63 has an annular flange 67 projecting from its outer circumferential surface outward in the radial direction. An annular magnet 66 forming part of a magnetic circuit is fixed to the inner circumferential surface of the circumferential wall 63. The hub 62 is made of a magnetic material, and the circumferential wall 63 has a function of a back yoke.

Three magnetic disks 16a, 16b, and 16c are mounted on the hub 62. These magnetic disks are coaxially fitted on the outer circumferential surface of the circumferential wall 63 of the hub 62, and are stacked on the flange 67 in the axial direction. A pair of spacer rings 68 are fitted on the circumferential wall 63 of the hub 62 and located among each two adjacent magnetic disks.

An annular fixing ring 70 is fixed to the upper end of the hub 62 with a plurality of screws 69 separated from each other in the circumferential direction. The fixing ring 70 has an outer diameter larger than the outer diameter of the hub 62 and the inner diameter of each magnetic disk 16. Hence, the magnetic disks 16a, 16b, and 16c are clamped between the flange 67 formed on the hub 62 and the fixing ring 70 through the spacer rings 68, and are held on the hub 62 to be rotatable together with the hub 62 about the central axis C.

A screw hole is formed in the upper end of the support shaft 60, and a screw 72 is screwed in this screw hole through a through hole 71 formed in a top cover 14 of the magnetic disk drive. In other words, the lower end of the shaft 60 is fixed to the bracket 27 of the spindle motor 25, and the upper end of the shaft 60 is fixed to the top cover 14, so that the support shaft 60 is supported with a double-sided support structure.

A stator 32 of the spindle motor 25 has a substantially cylindrical stator core 42 and a plurality of coils 46 mounted on the stator core 42. The stator core 42 is fixed to the bracket 27, and is arranged between the circumferential wall 63 and the support 64 of the hub 62 to be coaxial with them.

In the same manner as in the embodiments described above, the stator core 42 is formed by stacking a number of core forming members, and has an annular portion 43, a plurality of winding portions 44, and pole portions 45 closely opposing a magnet 66. Each winding portion 44 is squeezed in the direction of the central axis C, i.e., in the stacking direction, and its stacking thickness is smaller than the stacking thickness of the annular portion 43 and the pole portion 45. The coil 46 is wound on each squeezed winding portion 44.

Also in this still other embodiment having the above arrangement, the stacking thickness of the stator core 42 can be increased by increasing the number of core forming members stacked without increasing the thickness of the entire stator 32, i.e., without increasing the thickness of the spindle motor 25 in the direction of the central axis C. Accordingly, the torque characteristics of the spindle motor 25 can be largely improved by increasing the motor constant without changing the entire height of the spindle motor 25.

When the torque characteristics of the spindle motor 25 are improved, various operations and effects can be obtained, e.g., reduction in starting time of the magnetic disk, increase in stability of the rotation of the magnetic disk against the load, realization of an increase in capacity in accordance with an increase in number of mounted magnetic disks, and the like.

The spindle motor and its manufacturing method according to the present invention are not limited to those of a magnetic disk drive, but can be similarly applied to spindle motors used in other applications, as a matter of course.

As has been described above in detail, according to the present invention, a spindle motor, the magnetic circuit characteristics of which are improved without increasing the entire thickness, and its manufacturing method can be provided, and a small-size spindle motor having a decreased entire thickness and its manufacturing method can also be provided when the same magnetic circuit characteristics are set.

Furthermore, according to the present invention, a magnetic disk apparatus having the spindle motor described above and improved starting speed, stability, and the like can be provided.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of manufacturing a spindle motor including a rotor supported to be rotatable about a central axis and having an inner circumferential surface on which a magnet is provided, and a stator arranged inside the inner circumferential surface to oppose the magnet, the stator including a substantially annular stator core having an annular portion, a plurality of winding portions extending from the annular portion radially outward with respect to the central axis, and pole portions formed on the extended ends of the respective winding portions and opposing the magnet, and a coil wound on each of the coil winding portions, said method comprising the steps of:

preparing a plurality of plate-shaped annular core forming members, each annular core forming member having an annular portion, a plurality of winding forming portions extending from the annular portion radially outward, and pole portion forming portions formed at the extended ends of the winding forming portion;

stacking said plurality of core forming members coaxially to form the stator core;

squeezing the entire plurality of winding portions, formed by stacking the annular core forming members, in a direction of the central axis by plastic formation such that a thickness of the winding portions in the direction of the central axis is smaller than those of the annular portion and each of the pole portions; and winding a coil on the entire plurality of squeezed winding portion, thus constituting a stator.

2. A method of manufacturing a spindle motor including a rotor supported to be rotatable about a central a axis and having an inner circumferential surface on which a magnet is provided, and a stator arranged inside the inner circumferential surface to oppose the magnet, said method comprising the steps of:

forming a substantially annular stator core having an annular portion, a plurality of winding portions extending from the annular portion radially outward with respect to the central axis, and pole portions formed on extending ends of the respective winding portions and opposing the magnet;

squeezing each of the winding portions in a direction of the central axis by plastic formation such that a thickness thereof in the direction of the central axis is smaller than those of the annular portion and each of the pole portions, while an inner circumferential surface of the annular portion of the stator core is held by an inner jig having an outer circumferential surface which abuts against the inner circumferential surface of the annular portion, and the pole portions are held by a substantially cylindrical outer jig having an inner circumferential surface which abuts against outer surfaces of the pole portions and a plurality of projecting portions projecting from the inner circumferential surface and inserted in gaps among the winding portions to abut against the outer circumferential surface of the annular portion; and winding a coil on each of the squeezed winding portions, thus constituting a stator.

3. A method of manufacturing a spindle motor including a rotor supposed to be rotatable about a central axis and having an inner circumferential surface on which a magnet is provided, and a stator arranged inside the inner circumferential surface to oppose the magnet, the stator including a substantially annular stator core having an annular portion, a plurality of winding portions extending from the annular portion radially outward with respect to the central axis, and pole portions formed on the extended ends of the respective winding portions and opposing the magnet, and a coil wound on each of the coil winding portions, said method comprising the steps of:

preparing a plurality of plate-shaped annular core forming members, each annular core forming member having an annular portion, a plurality of winding forming portions extending from the annular portion radially outward, and pole portion forming portions formed at the extended ends of the winding forming portions;

squeezing the winding forming portions of each of the core forming members in a direction of the central axis by plastic formation such that a thickness of each winding forming portion in the direction of the central axis is smaller than those of the annular portion and each of the pole portion forming portions;

coaxially stacking said plurality of core forming members, after squeezing the winding forming portions, to form the stator core having a plurality of winding portions each of which is formed by stacking the squeezed winding forming portions; and winding a coil on each of the winding portions, thus constituting a stator.

4. A method of manufacturing a spindle motor including a rotor supported to be rotatable about a central axis and having an inner circumferential surface on which a magnet is provided, and a stator arranged inside the inner circumferential surface to oppose the magnet, the stator including a substantially annular stator core having an annular portion, a plurality of winding portions extending from the annular portion radially outward with respect to the central axis, and pole portions formed on the extended ends of the respective winding portions and opposing the magnet, and a coil wound on each of the coil winding portions, said method comprising the steps of:

preparing a plurality of plate-shaped annular core forming members, each annular core forming member having an annular portion, a plurality of winding forming portions projecting from the annular portion radially outward, and pole portion forming portions formed at the extended ends of the winding forming portions;

stacking said plurality of core forming members coaxially to form the stator core;

squeezing the entire winding portions, each of which is formed by stacking the annular core forming members, in a direction of the central axis by plastic formation such that a thickness of each winding portion in the direction of the central axis is smaller than those of the annular portion and each of the pole portions, while an inner circumferential surface of the annular portion of the stator core is held by an inner jig having an outer circumferential surface which abuts against the inner circumferential surface or the annular portion, and the pole portions are held by a substantially cylindrical outer jig having an inner circumferential surface which abuts against outer surfaces of the pole portions and a plurality of projecting portions projecting from the inner circumferential surface and inserted in gaps among the winding portions to abut against the outer circumferential surface of the annular portion; and winding a coil on each of the squeezed winding portions, thus constituting a stator.

5. A method of manufacturing a spindle motor including a rotor supported to be rotatable about a central axis and having an inner circumferential surface on which a magnet is provided, and a stator arranged inside the inner circumferential surface to oppose the magnet, said method comprising the steps of:

forming a substantially annular stator core having an annular portion, a plurality of winding portions extending from the annular portion radially outward with respect to the central axis, and pole portions formed on extending ends of the respective winding portions and opposing the magnet;

squeezing each of the winding portions in a direction of the central axis by plastic formation such that a thickness thereof in the direction of the central axis is smaller than those of the annular portion and each of the pole portions, while holding an inner circumferential surface of the annular portion of the stator core and the pole portions by holding means which has a first circumferential surface abutting against the inner circumferential surface of the annular portion, a second circumferential surface abutting against outer surfaces of the pole portions, and insertion portions inserted in gaps among the winding portions to abut against the outer circumferential surface of the annular portion; and winding a coil on each of the squeezed winding portions, thus constituting a stator.

* * * * *